March 23, 1971  D. K. MURRELL ET AL  3,572,219

MULTIPLE-CAM REGULATOR CONVERTER

Filed Oct. 15, 1969  4 Sheets-Sheet 1

INVENTORS,

Donald K. Murrell
Jay R. Katchka

BY Anthony A. O'Brien

ATTORNEY

March 23, 1971 D. K. MURRELL ET AL 3,572,219

MULTIPLE-CAM REGULATOR CONVERTER

Filed Oct. 15, 1969 4 Sheets-Sheet 2

INVENTORS,
Donald K. Murrell
Jay R. Katchka

BY Anthony N. O'Brien

ATTORNEY

INVENTORS,
Donald K. Murrell
Jay R. Katchka
BY Anthony A. O'Brien
ATTORNEY

March 23, 1971     D. K. MURRELL ET AL     3,572,219
MULTIPLE-CAM REGULATOR CONVERTER
Filed Oct. 15, 1969     4 Sheets-Sheet 4
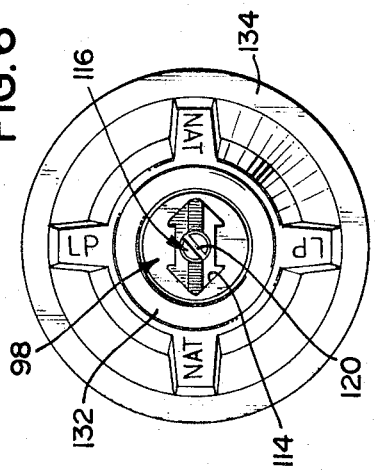
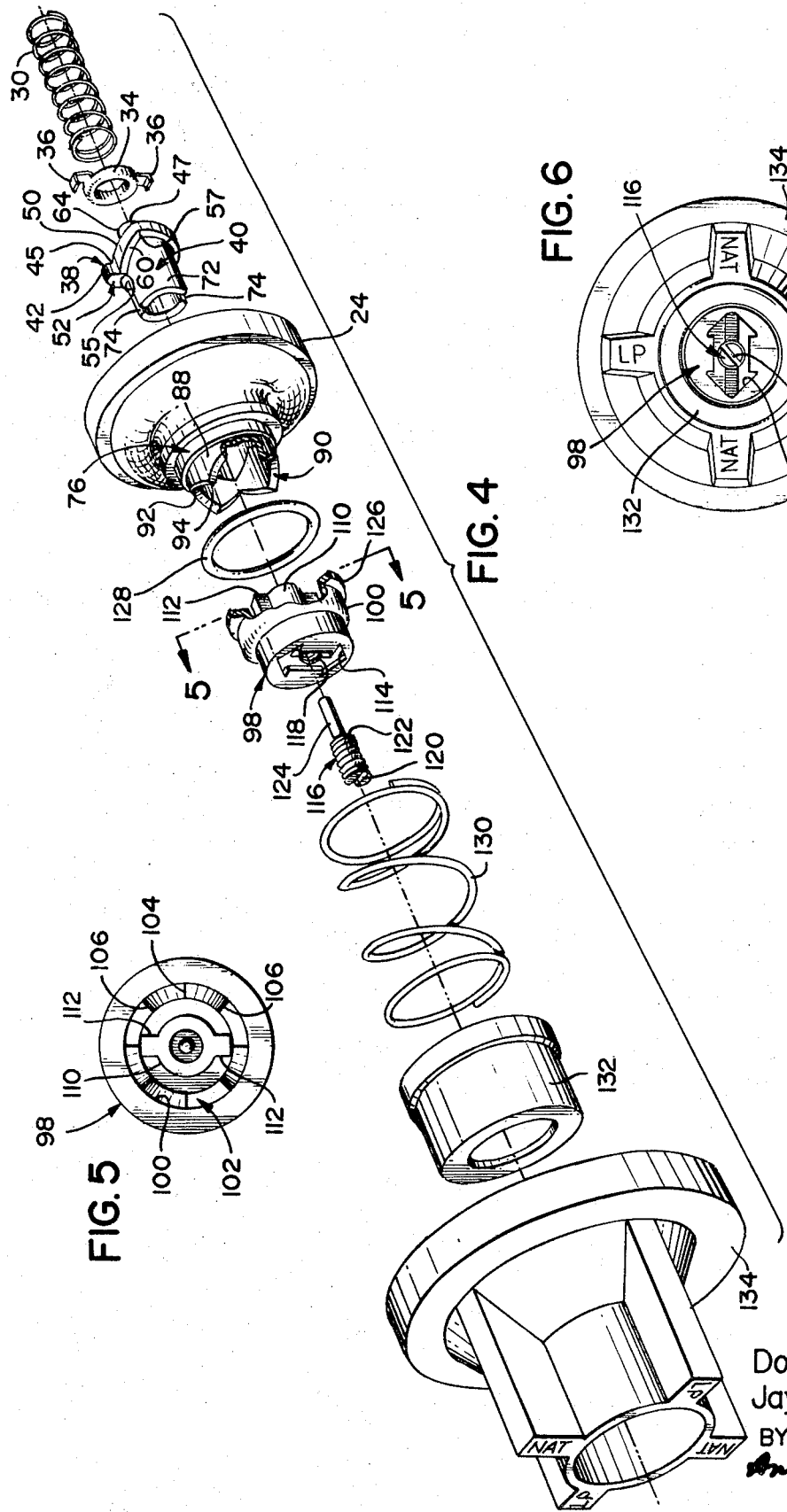
INVENTORS,
Donald K. Murrell
Jay R. Katchka
BY
*Anthony A. O'Brien*
ATTORNEY United States Patent Office 3,572,219
Patented Mar. 23, 1971

3,572,219
MULTIPLE-CAM REGULATOR CONVERTER
Donald K. Murrell, Le Mirada, and Jay R. Katchka, Long Beach, Calif., assignors to Robertshaw Controls Company, Richmond, Va.
Filed Oct. 15, 1969, Ser. No. 866,493
Int. Cl. F16k 7/16
U.S. Cl. 92—133                16 Claims

ABSTRACT OF THE DISCLOSURE

A pressure regulator changeover device having a two position adjustment in the form of a biased operator member movable along a cam surface to preclude any intermediate positioning thereof, and a low cam-angle double-action cam follower member operatively coupled to the biased operator member for setting the biasing means to one of two predetermined regulator settings.

BACKGROUND OF THE INVENTION

(1) Field of the invention

This invention relates to a pressure regulator for delivering a fluid flow at a predetermined pressure, and in particular, to such a regulator provided with a smooth acting multiple cam adjustment mechanism providing large conversion movement to select one of two predetermined pressures.

(2) Description of the prior art

The prior art, as exemplified by U.S. Pat. No. 3,338,264 is representative of pressure regulating devices designed to regulate the pressure of two different types of fuels, e.g. the pressure of natural or manufactured gas and the pressure of liquid petroleum gas, for different types of burner apparatus. However, the known prior art regulators are not effective to provide the large conversion movement of pressure regulating elements which is often required for various applications such as direct main line regulation.

SUMMARY OF THE INVENTION

The present invention is summarized in that a pressure converter for use in a pressure regulator having a flexible regulating diaphragm includes a biasing spring exerting a regulatory biasing force on the diaphragm, a stationary cam member, a first cam follower adapted for axial movement upon the stationary cam member between first and second defined positions, an operator member engaging the first cam follower for assuring complete movement of the first cam follower between its first and second positions, a second cam follower engaging the biasing spring for selecting the application of a first biasing force corresponding to a first predetermined regulator setting when the first cam follower is in its first defined position and the application of a second biasing force corresponding to a second predetermined regulator setting when the first cam follower is in its second defined position, and the second cam follower being mounted in fixed rotational orientation with the stationary cam member for axial movement upon a first cam surface of the first cam follower, the axial movement of the second cam follower being greater than the axial movement of the first cam follower.

Thus, it is one object of the present invention to assure the setting of a pressure regulator to one of two predetermined positions.

An additional object of this invention is to provide a pressure regulator with multiple interacting cams having low pitch cam surfaces to effect large conversion movement of pressure setting elements.

Other objects and advantages of the present invention will become more fully apparent from the following detailed description of a preferred embodiment of the invention when considered in conjunction with the accompanying drawings.

BRIEF DESCRIPTION OF THE DRAWINGS

FIG. 4 is an exploded perspective view of the adjustment mechanism of the converter of FIGS. 1, 2 and 3;

FIG. 5 is a bottom view of an operator member of the adjustment mechanism taken along line 5—5 in FIG. 4;

FIG. 6 is a plan view of the converter in the position illustrated in FIG. 1.

DESCRIPTION OF THE PREFERRED EMBODIMENT

Figure 1:
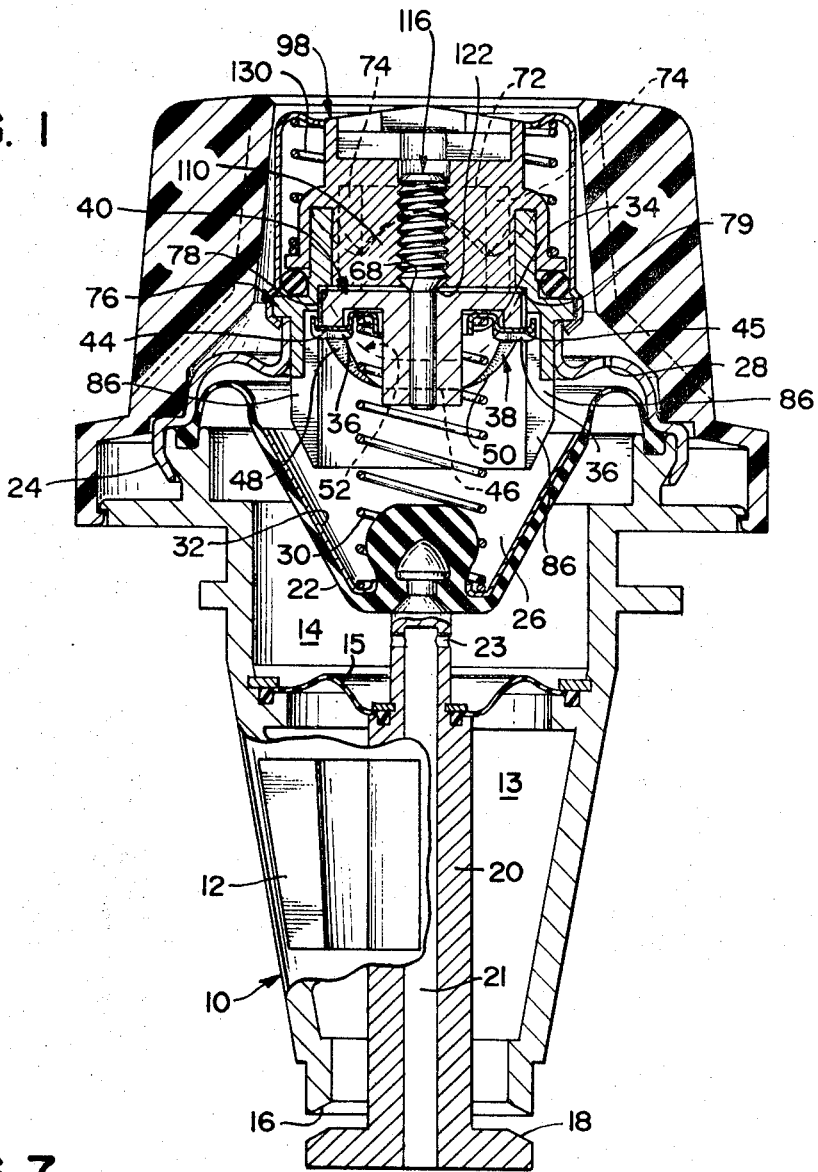
FIGS. 1, 2 and 3 are cross-sections of a preferred embodiment of the converter of the present invention in a first pressure setting, an intermediate position and a second pressure setting, respectively.
Figure 2:
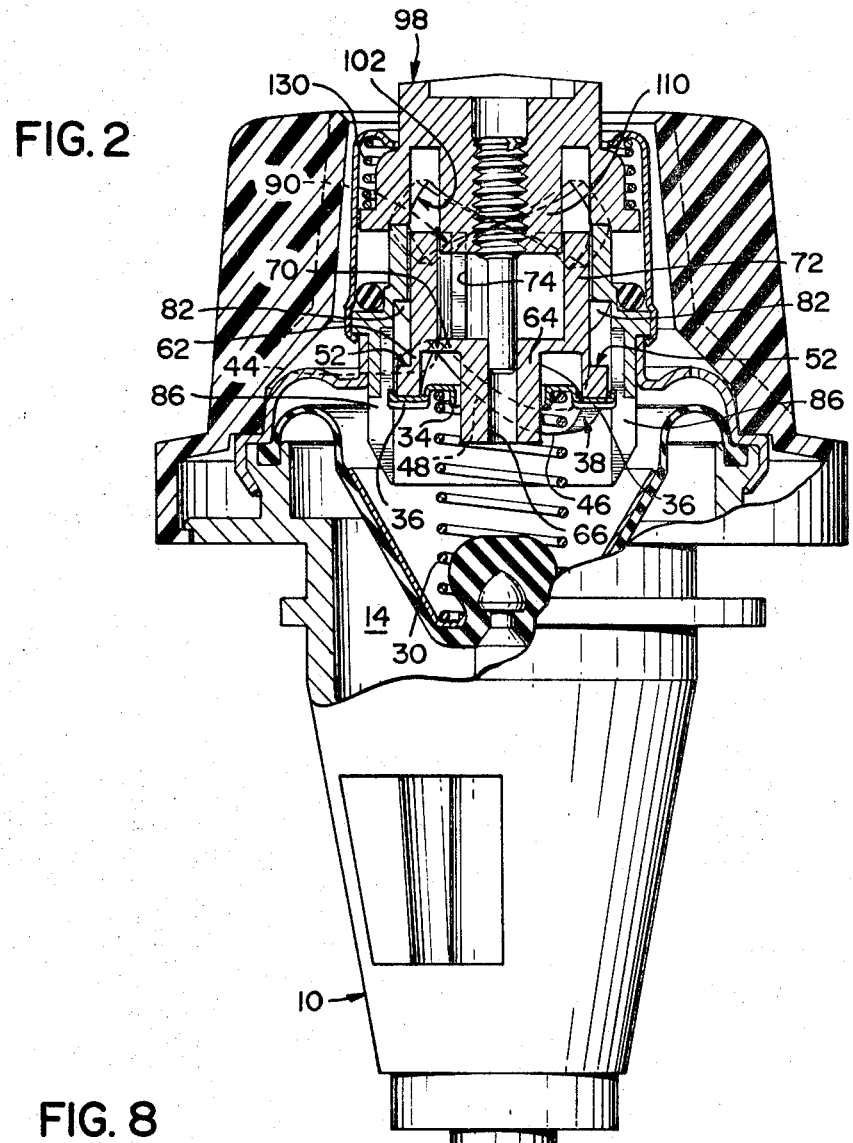
Figure 3:
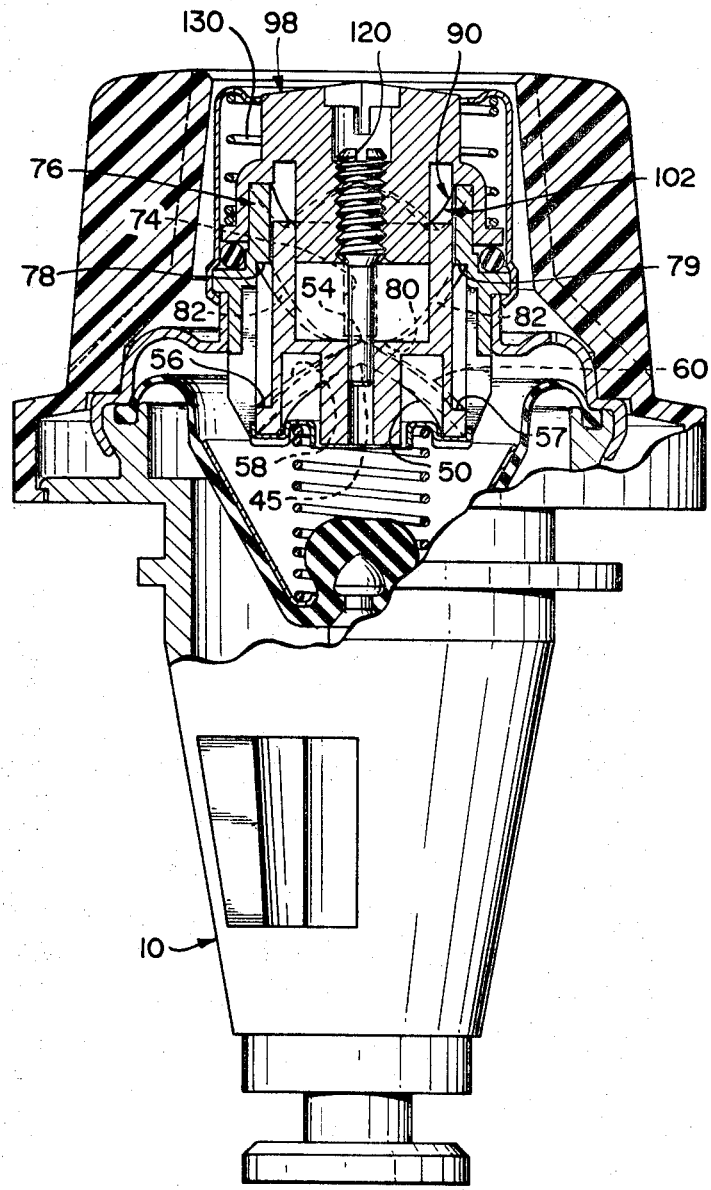

As illustrated in FIGS. 1–3, the present invention is embodied in a pressure regulator, indicated generally at 10, having an inlet 12 leading to an inlet chamber 13 which is separated from a pressure chamber 14 by diaphragm 15. Inlet chamber 13 communicates with an outlet valve seat 16 provided in a lower portion of the casing of the regulator 10. A valve element 18 cooperates with the upstream side of valve seat 16 and has a stem 20 extending therefrom and defining a hollow bore 21 which opens into pressure chamber 14 at posts 23. The upper end of stem 20 is affixed to the central portion of a flexible diaphragm 22 which is sealed and mounted at its periphery between the casing 10 and a diaphragm cover 24 firmly crimped about an upper exterior rim thereof. The diaphragm 22 defines a movable wall between the pressure chamber 14 and an upper chamber 26 which is vented through a restrictor vent 28 in the diaphragm cover 24.

A coil spring 30 is disposed in upper chamber 26 and is held in compression between backing plate 32 mounted upon a central portion of diaphragm 22 and an annular spring retainer or guide 34 having a pair of diametrically opposed L-shaped flanges 36; spring 30 exerts a regulatory biasing force on diaphragm 22 and an equal and opposite force on spring guide 34 which causes flanges 36 to ride against and thus follow lower cam surface 38 of a generally cylindrical cam follower 40.

The lower cam 38 of cam folower 40 is formed upon the bottom surface of a ring 42 located along the lower outer periphery of the cam follower and includes a pair of diametrically opposed upper abutments 44–45 and a pair of diametrically opposed lower abutments 46–47 displaced 90° from the upper abutments 44–45. A pair of sloping walls defining cam surfaces 44–48 extend from the lower abutments 46–47 to upper abutment 44; similarly, a second pair of cam surfaces 50—50 extend from the lower abutment 46–47 to upper abutment 45.

The top surface of ring 42 forms an upper cam 52 having a pair of diametrically opposed upper abutments 54–55 and a pair of diametrically opposed lower abutments 56–57 displaced 90° from the upper abutments 54–55. A pair of sloping walls defining cam surfaces 58—58 extend from upper abutments 54–55 to lower abutment 56; in like manner, a pair of sloping walls defining cam surfaces 60—60 extend from upper abutments 54–55 to lower abutment 57.

It is noted that the upper and lower abutments of upper cam 52 are vertically aligned with the upper and lower abutments, respectively, of lower cam 38 giving the annular ring member 42 its zigzagged appearance (see FIG. 4). It should also be understood that while the cam angles of upper and lower cams 52 and 38 are illustrated as being approximately equal, rendering the cross-section of ring 42 substantially constant, different cam angles may be employed in accordance with desired operational characteristics pertinent to various particular applications of the converter.

Ring 42 is formed upon a lower cylindrical wall 62 of the cam follower 40 which surrounds an axially aligned central hub 64 upon which spring guide 34 is slidably disposed. A hole 66, having an upper, internal edge 68 longitudinally extends through the center of hub 64 to accommodate the lower portion of an adjusting pin, to be described more fully below. A partition 70 divides the lower wall 62 from a cylindrical upper wall 72 upon which are formed a pair of diametrically opposed slots 74 extending from the upper extremity of the cam follower to the partition.

Cam follower 40 is disposed within an internal cavity defined by a main body member 76. A pair of upper abutments 78–79 (see FIG. 3) are located upon the inner surface of the cavity, the upper abutments being diametrically opposed; similarly, a pair of diametrically opposed lower abutments 80–81 are located upon the inner surface of the main body member and are displaced 90° from the upper abutments. A pair of sloping walls defining cam surfaces 82—82 extend from upper abutments 78–79 to lower abutment 80, while a pair of sloping walls defining cam surfaces 84—84 extend from the upper abutments to lower abutment 81. The dimensions of cam surfaces 82 and 84 and the cam angles provided thereby, are designed to cooperate with upper cam 52 of cam follower 40 to produce axial displacement of the cam follower upon rotation. The lower portion of main body member 76 defines a pair of longitudinal grooves 86 which cooperate with diametrically opposed flanges 36 of spring guide 34 to allow the guide to be axially displaced upon lower cam 38 of cam follower 40 while precluding rotation thereof.

Formed upon the upper portion of main body member 76 is an annular wall 88 having a top surface defining a cam 90 which includes four root portions 92 alternately disposed between four peak portions 94, adjacent root and peak portions being equally displaced from each other by a plurality of contiguous sloping cam surfaces 96 to provide a continuous circumferential camming path.

An operator member 98 has a lower portion shaped to form an annular wall 100, the inner surface of which contains an inwardly protruding continuous shoulder forming a cam surface 102. Cam 102 contains four root portions 104 and four peak portions 106 equally displaced from each other by like cam surfaces 108 designed to cooperate with cam 90 of main body member 76. The lower portion of operator 98 further includes a cylindrical hub 110 (FIG. 5) centrally disposed within the void defined by annular wall 100 and having diametrically opposed keying flanges 112 shaped to slidably fit within slots 74 of the cam follower 40 for the transmission of rotary motion thereto. The upper section of operator member 98 is provided with a generally rectangular tool receiving depression 114 (FIGS. 4 and 6) having an indicator arrow at each end so that the position of the operator can readily be observed.

An adjusting pin 116 is threadably mounted within a bore 118 extending axially through the operator member 98 and includes an upper tool receiving head 120 and an adjusting shoulder 122 which separates the threaded upper portion of the pin from a smooth surfaced extension 124 for maintaining alignment of the cam follower during operation of the regulator. Adjusting shoulder 122 cooperates with upper internal edge 68 of hole 66 in cam follower 40 to permit adjustment of the retracted position thereof, as will become clear below.

An outwardly protruding continuous lip 126 is formed upon the lower edge of annular wall 100 and is biased against a resilient ring seal 128 by a spring biasing member 130. Spring 130 is mounted in compression between the upper surface of the lip 126 and a cap 132 firmly affixed onto the main body member 76.

A dial cover 134 substantially surrounds the upper portion of the regulator and is held in place by an inwardly protruding ring while the upper surface of the cover 134 contains appropriate indicia for enabling identification of the setting of the regulator adjusting elements at any time.

In describing the operation of the present invention, reference will be made to the schematic linear representations in FIGS. 7, 8 and 9, the elements illustrated therein being identified by the same numbers used to identify functionally similar elements in FIGS. 1–5 with 500 added thereto.

Referring now to FIG. 1, the regulator is shown in a first pressure regulating position typically corresponding to a natural gas setting. In this setting, operator member 98 is located in a nesting position upon main body member 76 under the influence of biasing spring 130 with each of the opposed keying flanges 112 (FIG. 5) lying alongside the hub 110 as visualized in FIG. 1. The opposing slots 74 of upper wall portion 72 of the cam follower 40 are keyed with and completely surround flanges 112 so that in this setting, upper cam 52 of the cam follower is permitted to rest in substantially complete contact with cam surfaces 82–84 of main body member 76 while the upper abutments 44–45 of lower cam 38 are located immediately adjacent the top of aligning grooves 86; the cam follower is maintained in this position by the biasing force exerted by biasing member 30 through flanges 36 of annular spring guide 34. The flanges 36, which are disposed in grooves 86, thus rest upon abutments 44–45 of the lower cam 38 of cam follower 40 maintaining biasing member 30 in a first position whereupon a biasing force corresponding to a natural gas regulator setting is exerted against the diaphragm member 22 for controlling the position of the valve 18 with respect to valve seat 16.

In order to meet burner and appliance pressure requirements so as to maintain a consistent burner input at an optimum burner pressure, an adjustment is provided for the natural gas setting of the regulator in the form of threaded pin 116. As seen in FIG. 1, shoulder 122 of the pin cooperates with annular internal edge 68 of hole 66 in the cam follower to limit the retracted position thereof and accordingly set the biasing force to be applied to the diaphrgam for regulating natural gas. The pin is easily adjusted by inserting a tool, such as a screwdriver, into the slotted head 120 (see FIG. 3) of pin 116 and rotating it until the desired regulated output pressure is observed. This adjustment would normally be made at the factory prior to installation; however, the design of the regulator readily permits readjustment in the field without necessitating removal of the regulator or any of its subassemblies.

Figure 7:
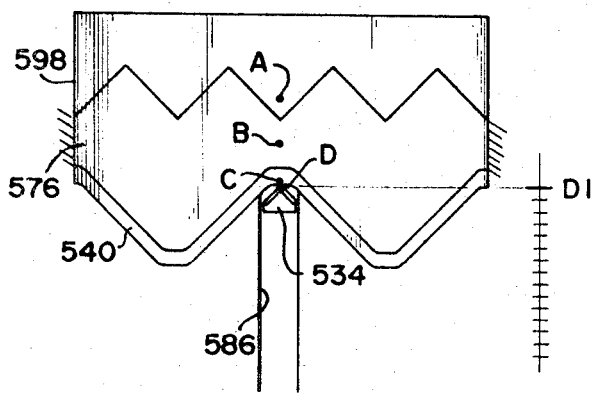
FIGS. 7, 8 and 9 are schematic linear representations of the relationship among the conversion elements illustrated in FIGS. 1, 2 and 3, respectively.

As seen in FIG. 7, which illustrates schematically the operative position of the converter elements in the natural gas setting described above, stationary main body member 576 has upper and lower cam surfaces which cooperate with the corresponding cam surfaces of operator member 598 and cam follower member 540, respectively; operator 598 and cam follower 540 are keyed together for rotation while element 576 remains fixed. Spring guide member 534 is positioned to ride along the lower cam surface of cam follower 540 within groove 586. As seen in the figure, a set of indexing points A–D is provided to more clearly indicate the relative motion of the members during the sequence to be described below. As seen in FIG. 7, points A–D are vertically aligned in the natural gas setting. In addition, a scale indicating the vertical positioning of guide member 534 is shown to the right of each of the schematic illustrations, the guide position being shown as D1 in FIG. 7 representing the maximum upwardly retracted setting of the converter for providing the required regulator biasing force for natural gas.

When it is desired to convert the regulator to its second regulator setting, which typically corresponds to the setting required for liquid petroleum gas, the operator member 98 is rotated in either direction by a suitable tool inserted into depression 114 (FIG. 4) in the upper externally exposed portion thereof. After rotation of the operator through a 45° arc, the intermediate position illustrated in FIG. 2 is reached.

As operator member 98 is rotated from its position in FIG. 1 to that shown in FIG. 2, the interaction of cam surfaces 102 of the operator member and 90 of the main body member 76 cause the operator member to axially move away from the main body member against the compression force of spring 130; its maximum vertically extended position is reached when the peaks of cam 102 are in direct contact with the peaks of cam 90. Since operator member 98 is keyed to the cam follower 40 for rotation by the interaction of flanges 112 of hub 110 of the operator member and slots 74 of the cam follower, the rotation of the operator member produces a like rotation of the cam follower. Consequently, the cam follower 40 becomes axially displaced in a downward direction by the coaction of cam surfaces 82–84 of the main body member 76 and upper cam 52 of the cam follower. This axial displacement is also transmitted to the spring guide 34 through flanges 36 which ride on lower cam 38 of the cam follower. Since the spring guide cannot rotate with the cam follower because of the keying action of grooves 86 in main body member 76, and flanges 36, the guide is further displaced vertically by the action of lower cam 38 against the flanges. The displacement of the flanges by lower cam 38, when added to the displacement produced by the axial movement of the cam follower 40, results in a total axial displacement of spring guide 34 which is much greater than that which could be produced by single cam action with the relatively low cam angles presently employed.

Figure 8:
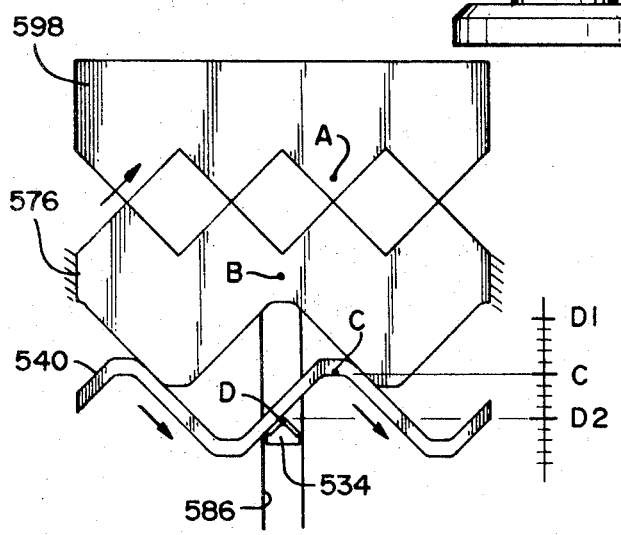
Figure 9:
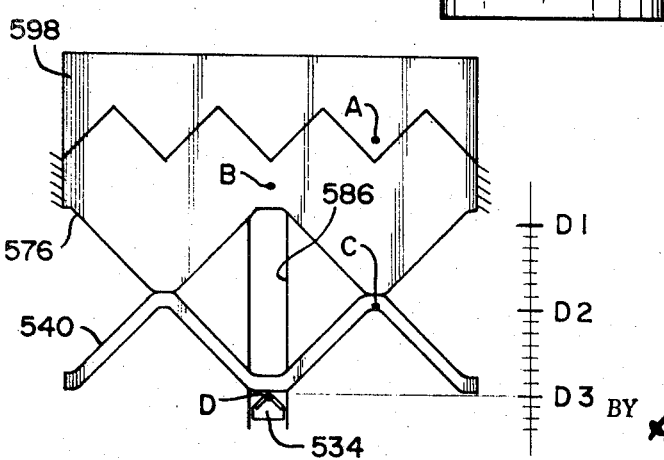

The intermediate position of the regulator elements in FIG. 2 is represented schematically in FIG. 8, where operator 598 and cam follower 540 have been moved horizontally by an equal amount, corresponding to the keyed rotation of operator 98 and cam follower 40, while stationary member 576 and guide 534 have remained vertically aligned. The horizontal movement of operator 598 causes it to become vertically displaced by the cam surfaces until it reaches its maximum extended position, as shown. Similarly, cam follower 540 is downwardly displaced by the cam action of its upper cam against stationary member 576 which causes the vertical movement of guide 534 to position D2. As seen in FIG. 8, the double cam action of the regulator produces a large conversion movement of guide 534 which is the sum of a first component caused by the displacement of the cam follower by the cam surface of the stationary member and a second component caused by the movement of the guide by cam action upon the lower cam of the displaced cam follower. In other words, as the cam follower is rotated, it moves down form its natural gas position to the point designated as C on the vertical scale in FIG. 8. If the spring guide were free to rotate with the cam follower, only the conventional displacement thereof to position C would be produced; however, since the guide cannot rotate, due to grooves 586, it is displaced an additional amount along the lower cam of the cam follower to the point identified as D2 on the scale.

Continuing with the conversion, as the operator 98 in FIG. 2 is turned slightly over the peaks of the cam 90 in main body member 76, the force exerted thereon by spring 130 causes the operator to continue its rotation until cam surfaces 90 and 102 again nest, as shown in FIG. 3. The operator is now set in the second regulator position corresponding, for example, to a liquid petroleum (LP) gas setting, whereupon both operator 98 and cam follower 40 have been rotated 90° from the natural gas setting shown in FIG. 1. The 90° rotation of the cam follower causes its upper cam surface 52 to ride along the camming surfaces 82–84 of the main body member 76 until the upper abutments 54–55 thereof engage the lower abutments 80–81 of the stationary cam to define the maximum extended position of the cam follower. Similarly, spring guide 34 is displaced to its lowest position by the axal displacement of flanges 36 upon cam surfaces 38 of cam follower 40 to the point where the flanges rest upon lower abutments 46–47 thereof. Thus, the spring guide is repositioned to additionally compress biasing member 30 for regulating liquid petroleum gas. The positioning of the elements is again schematically represented in FIG. 9 where the completed conversion displacement of the guide member 534 to position D3 can clearly be seen.

To convert back to the natural gas position, the operator 98 is simply rotated 90° in either direction whereby the above sequence of events will take place in the reverse order.

It is noted that the camming surfaces of the operator 98, the main body member 76 and the cam follower 40 permit rotation of the cam follower in either a clockwise or counterclockwise direction so that the reset conversion may be simply performed by an unskilled person without specific instructions. In addition, the operator 98, and consequently the cam follower 40, can only assume one of two positions because the spring biasing of the operator member will cause the cam 102 to ride down the cam surfaces 96 whenever the peaks of cams 90 and 102 are not in a contiguous abutting position. Such an over-center cam arrangement precludes any intermediate settings of the cam follower so that the spring biasing member 30 can only be set at a natural gas or a liquid petroleum gas setting. The elimination of intermediate settings removes a great hazard from gas burner apparatus that has been specifically designed for a particular type of gas. In addition, through the use of double-action, multiple-cam conversion, large conversion movement can be smoothly effectuated thereby permitting use of the regulator in the main line as well as in the bleeder line of a burner apparatus.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a pressure regulator having a flexible regulating diaphragm, a pressure converter comprising:
   biasing means exerting a regulatory biasing force on said diaphragm,
   stationary cam means,
   first cam follower means adapted for axial movement upon said stationary cam means between first and second defined positions,
   operator means engaging said first cam follower means for assuring complete movement of said first cam follower means between its first and second positions,
   second cam follower means engaging said biasing means for selecting the application of a first biasing force corresponding to a first predetermined regulator setting when said first cam follower means is in said first defined position and the application of a second biasing force corresponding to a second predetermined regulator setting when said first cam follower is in said second defined position, and
   said second cam follower means being mounted in fixed rotational orientation with said stationary cam means for axial movement upon a first cam surface of said first cam follower means.

2. The invention as recited in claim 1 wherein said first cam follower means includes a second cam surface comprising a plurality of spaced abutments to cooperate with said stationary cam means.

3. The invention as recited in claim 2 wherein said plurality of abutments include a pair of diametrically opposed upper abutments and a pair of diametrically opposed lower abutments.

4. The invention as recited in claim 3 wherein each of said upper abutments are radially spaced from each of said lower abutments by a respective sloping cam surface.

5. The invention as recited in claim 4 including a casing defining an axial bore therethrough, and wherein said stationary cam means comprises a plurality of spaced abutments mounted within the axial bore of said casing.

6. The invention as recited in claim 5 wherein said plurality of abutments comprise a pair of diametrically opposed upper abutments and a pair of diametrically opposed lower abutments.

7. The invention as recited in claim 6 wherein each of said upper abutments are radially spaced from each of said lower abutments by a respective sloping cam surface.

8. The invention as recited in claim 7 wherein said second cam surface of said first cam follower means cooperates wiht said stationary cam means to define said first position of said cam follower means when said upper and lower abutments of said second cam surface contact said upper and lower abutments, respectively, of said stationary cam means, and to define said second position of said cam follower means when said upper abutment of said second cam surface contacts said lower abutment of said stationary cam means.

9. The invention as recited in claim 8 wherein said first cam surface of said first cam follower means includes a pair of diametrically opposed lower abutments and a pair of diametrically opposed upper abutments radially spaced from each other by respective sloping cam surfaces, the upper and lower abutments of said first cam being positioned in axial alignment with the upper and lower abutments, respectively, of said second cam.

10. The invention as recited in claim 9 wherein said second cam follower means includes a pair of diametrically opposed flanges, and wherein the axial bore of said casing has a pair of diametrically opposed axially aligned grooves cooperating with said flanges to permit axial movement of said second cam follower means and simultaneously prohibit rotational movement thereof.

11. The invention as recited in claim 10 wherein said flanges are adapted to engage said first cam surface of said first cam follower means causing axial displacement of said second cam follower means for setting the first and second biasing forces applied to said diaphragm.

12. The invention as recited in claim 11 wherein said first cam follower means comprises a cylindrical member operatively disposed within the axial bore of said casing.

13. The invention as recited in claim 12 wherein said operator means includes a key, and wherein said first cam follower means includes an axially oriented keyway adapted to cooperate with said key thereby to maintain rotational alignment of said operator means and said first cam follower means for positioning said first cam follower means to one of its first and second positions while precluding any intermediate positioning thereof.

14. The invention as recited in claim 13 wherein a compression means cooperates with said operator means to assure complete movement of said operator means between first and second positions.

15. The invention as recited in claim 14 wherein said operator means includes a cam surface defining said first and second positions of said operator means.

16. The invention as recited in claim 15 wherein said operator means includes an axially oriented threaded cylindrical void having one end carrying an adjustment screw adapted to engage said cam follower means and set the same to its first predetermined regulator setting and an opposite end open to externally receive a tool for adjusting said adjustment screw.

References Cited
UNITED STATES PATENTS 3,412,650  11/1968  Stang, Jr. _____ 92—133

EDGAR W. GEOGHEGAN, Primary Examiner

A. M. OSTRAGER, Assistant Examiner

U.S. Cl. X.R.

137—505.41; 267—172, 177